United States Patent

Jeong

[11] Patent Number: 5,841,234
[45] Date of Patent: Nov. 24, 1998

[54] DEVICE FOR SHIELDING ELECTRIC FIELD EMITTED BACKWARD FROM VIDEO DISPLAY APPLIANCE

[75] Inventor: Seok Hwa Jeong, Kumi, Rep. of Korea

[73] Assignee: LG Electronics, Inc., Rep. of Korea

[21] Appl. No.: 901,928

[22] Filed: Jul. 29, 1997

[30] Foreign Application Priority Data

Jul. 30, 1996 [KR] Rep. of Korea .................. 1996 31428

[51] Int. Cl.$^6$ ....................................................... H01J 1/52
[52] U.S. Cl. ................................ 315/85; 315/8; 313/402; 313/479
[58] Field of Search .............................. 315/85, 8, 368 F, 315/370, 371; 313/402, 408, 409, 479, 436

[56] References Cited

U.S. PATENT DOCUMENTS

| 4,896,081 | 1/1990 | Ichigaya et al. | 315/368 |
|---|---|---|---|
| 5,151,635 | 9/1992 | Cappels | 315/370 |
| 5,198,729 | 3/1993 | Powell | 315/370 |
| 5,347,196 | 9/1994 | Meershoek | 315/8 |
| 5,363,022 | 11/1994 | Kitou et al. | 315/8 X |
| 5,399,939 | 3/1995 | Greenberg et al. | 315/85 |
| 5,404,084 | 4/1995 | Onodera et al. | 315/370 |

*Primary Examiner*—Don Wong
*Assistant Examiner*—Haissa Philogene
*Attorney, Agent, or Firm*—Oppenheimer Wolff & Donnelly LLP

[57] ABSTRACT

A device for shielding an electrical field emitted backward from a video display appliance. The device includes a device for shielding an electrical field emitted backward from a video display appliance including a CRT having an anode to which a high voltage is supplied, a deflection yoke for deflecting electron beams produced from electron guns, and a video board for processing and outputting video signals to the CRT, the device comprising, a first patterned section printed on a periphery of a back of the video board and connected to ground, and a second patterned section printed inside the first patterned section, the scond patterned section having a pulse applying portion to which a pulse voltage having a polarity opposite to the electric field waveform is applied and a termination portion.

3 Claims, 3 Drawing Sheets

FIG. 1
*PRIOR ART*
FIG. 2
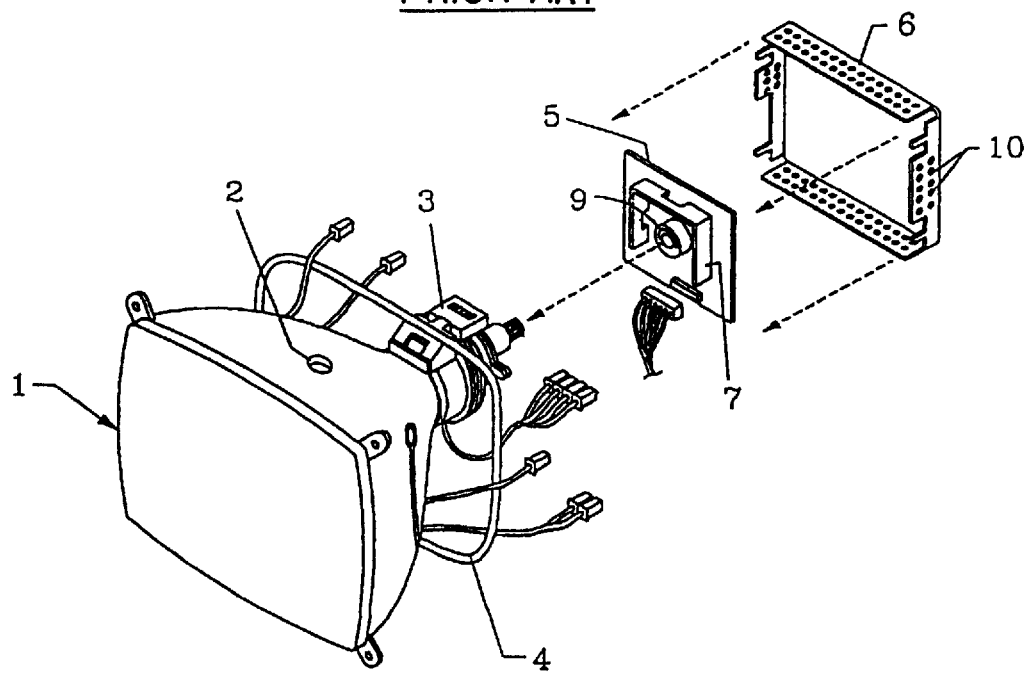
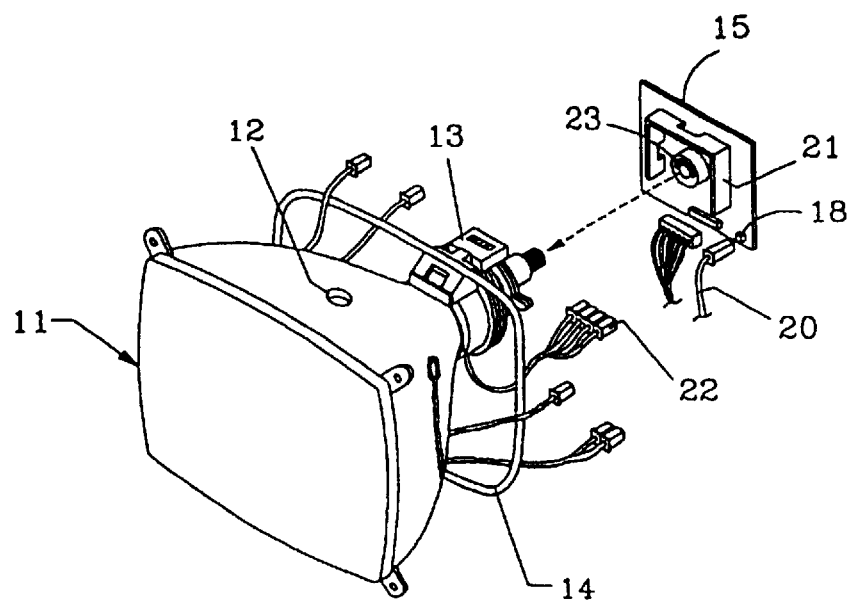

DEVICE FOR SHIELDING ELECTRIC FIELD EMITTED BACKWARD FROM VIDEO DISPLAY APPLIANCE

BACKGROUND OF THE INVENTION

1. Field of the Invention

The present invention relates to a device for eliminating an electric field emitted backward from a video board in a video display appliance providing a pulse pattern on the back of the video board.

2. Description of the Prior Art

A conventional video display appliance comprises, as shown in FIG. 1, a cathode ray tube (CRT) 1 having an anode 2 to which a high voltage is supplied, a deflection yoke 3 for deflecting electron beams produced from electron guns, a degaussing coil 4 for eliminating the magnetic force of a shadow mask by supplying an alternating magnetic force thereto, and a video board 5 for processing and outputting video signals to the CRT 1 to display the video signals on the CRT screen. The video board 5 includes a heat sink plate 7 for releasing the heat produced from the video board 5, and a socket 9 to which an electron gun plug is inserted. The conventional video display appliance further comprises a shielding plate 6 for shielding unwanted radiation emitted backward from the video board 5 while the video signals are processed and outputted to the CRT by the video board 5. A reference numeral 7 indicates a connector.

According to the conventional video display appliance as constructed above, when the power is on, a high voltage is supplied to the anode 2 of the CRT 1. The deflection yoke 4 deflects the electric beams emitted from the electron guns and the degaussing coil 4 eliminates the magnetic field of the shadow mask, to display the video on the screen of the CRT 1. However, the electric field is produced by the voltages supplied to respective elements as described above which is expressed as the below equation.

$$E = \frac{V}{d} \ [V/m]$$

where, E is a strength of the electric field, V is a voltage being applied to the respective elements, and d is a distance of the respective elements.

According to the above equation, the electric field E is produced in proportion to the voltage applied to the respective elements, and adversely effects users and electronic appliances near the video display appliance. In order to shield the electric field emitted backward from the video board 5 for processing and outputting video signals to the CRT 1, the video board 5 is provided on its back with a nonmagnetic shielding plate 6 which has a plurality of holes 10 formed thereon, and is made of a material having a good electrical conductivity and high permeability.

However, though the above shielding plate can eliminate the electric field emitted backward from the video board, it should be connected to the back side of the video board 5. Since such a connecting process is a labor intensive and time-consuming job, it will increase the productive cost. Also, the connection of the shielding plate with the heat sink for releasing the heat will cause the mechanical trouble to increase, thereby reducing the reliability of the product.

SUMMARY OF THE INVENTION

It is an object of the present invention to solve the problems in the prior art, and to provide a device for shielding the electric field emitted backward from a video board.

It is another object of the present invention to provide a device for eliminating the electric field emitted backward from the video board which can improve the productivity and reliability of the product without the necessity of a separate metal shielding plate connected to the video board.

In order to achieve the above objects, there is provided a device for shielding an electrical field emitted backward from a video display appliance including a CRT having an anode to which a high voltage is supplied, a deflection yoke for deflecting electron beams produced from electron guns, and a video board for processing and outputting video signals to the CRT, the device comprising a first patterned section formed on a periphery of a back of the video board and connected to ground, and a second patterned section printed inside the first patterned section, the second patterned section having a pulse applying portion to which a pulse voltage having a polarity opposite to the electric field waveform is applied.

The second patterned section is in the form of an open-loop type, and is printed on the back of the video board as a pattern having at least one turn.

BRIEF DESCRIPTION OF THE DRAWINGS

The above objects, other aspects, and advantages of the invention will become apparent by describing the preferred embodiment thereof with reference to the accompanying drawings, in which:

FIG. 1 is an exploded perspective view showing a prior art video display appliance having a device for eliminating unwanted radiation emitted backward from a video board.

FIG. 2 is an exploded perspective view showing a video display appliance having a device for eliminating unwanted radiation emitted backward from a video board according to the present invention.

DETAILED DESCRIPTION OF THE PREFERRED EMBODIMENTS

FIG. 2 is an exploded perspective view showing a video display appliance having a device for eliminating unwanted radiation emitted backward from a video board according to the present invention.

Figure 3:
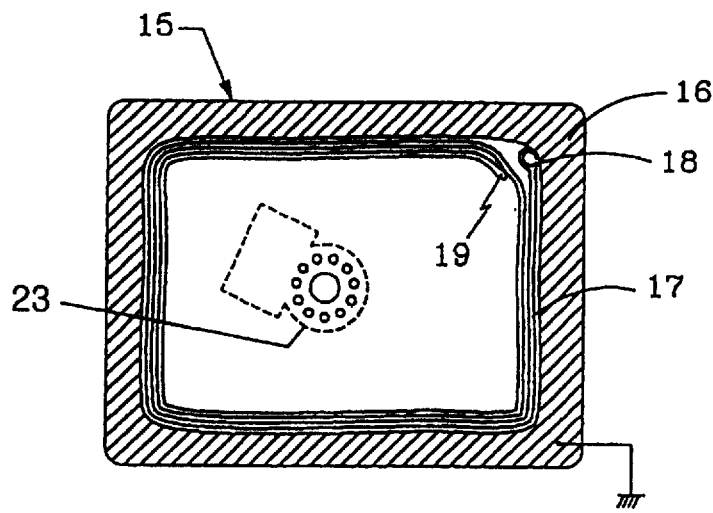
FIG. 3 is a perspective view showing a second patterned section printed on the back of a video board according to present invention.

Referring to FIG. 2 the video display appliance having the unwanted radiation eliminating device according to the present invention includes a CRT 11 having an anode 12 to which a high voltage is applied, a deflection yoke 13 for deflecting electron beams produced from electron guns, a degaussing coil 14 for eliminating the magnetic force of a shadow mask by supplying an alternating magnetic force thereto, and a video board 15 for processing and outputting video signals to the CRT 11 to display the video signals on the CRT screen. The video board 15 includes a heat sink plate 21 and a socket 23. Referring to FIG. 3, the video board 15 is substantially similar to the video board shown in FIG. 1 except that first and second patterned sections 16 and 17 of an electrically conductive material are printed on the back of the video board 15.

In particular, the video board 15 according to the present invention comprises a first patterned section 16 which is printed on the periphery of the back of the video board 15 and is connected to ground, and a second patterned section 17 printed inside the first patterned section 16, the second patterned section 17 having a pulse applying portion 18 to which a pulse voltage is applied and a termination portion 19. The second patterned section 17 is in the form of an open-loop type. A reference numeral 22 indicates a connector.

Figure 4:
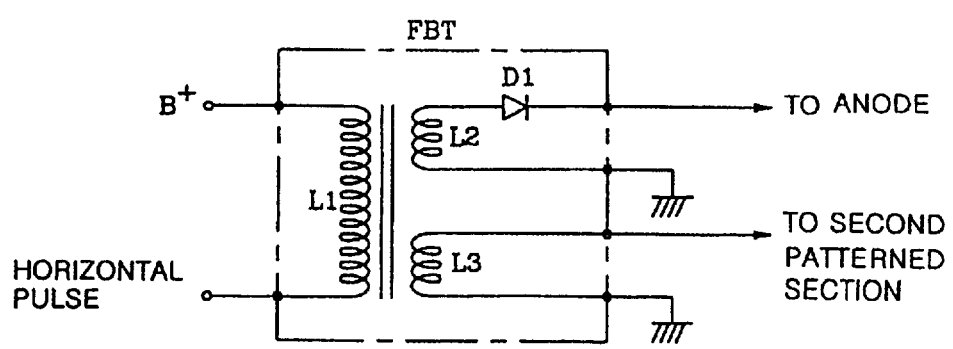
FIG. 4 is a schematic circuit diagram of a flyback transformer for supplying a voltage to the second patterned section of FIG. 3.

The above second patterned section 17 is supplied with a pulse-offset voltage from a third winding L3 as shown in FIG. 4. If the power supply voltage B+ is applied to the primary winding L1 of the flyback transformer FBT, a high voltage is induced in the secondary winding L2 thereof and the high voltage is supplied to the anode 12 of the CRT 11 through a high voltage diode D1. At the same time, a voltage waveform which has the opposite polarity to the voltage waveform which is applied to the video board 15 is induced in the third winding L3 of the flyback transformer and then is applied to the pulse applying portion 18 of the second patterned section 17.

Specifically, when the video display appliance operates in a normal state, the video board 15 connected to the CRT 11 is provided with a desired operating voltage and outputs video signals to the CRT 11 to display the video signals on the screen of the CRT 11.

Figure 5A:
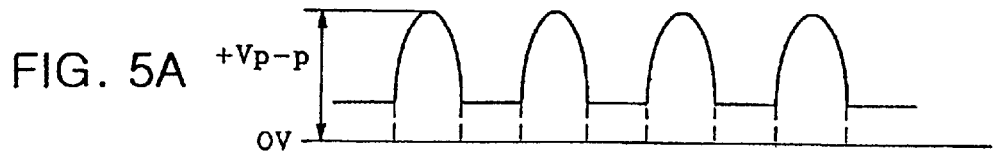
FIG. 5A is a waveform diagram of unwanted radiation emitted backward from the video board.

As the video board 15 connected to the CRT 11 is supplied with a desired operating voltage an the electric field is produced around the video board by the applied operating voltage as shown in FIG. 5A. The produced electric field radiates toward the peripheral components and then causes the electrical interference, but the second patterned section 17 printed on the back of the video board 15 shields the electric field emitted backward from the video board 15.

If a predetermined voltage is applied to the primary winding L1 of the flyback transformer as shown in FIG. 4, the high voltage is induced in the secondary winding L2 thereof and then is supplied to the anode 12 of the CRT 11.

Figure 5B:
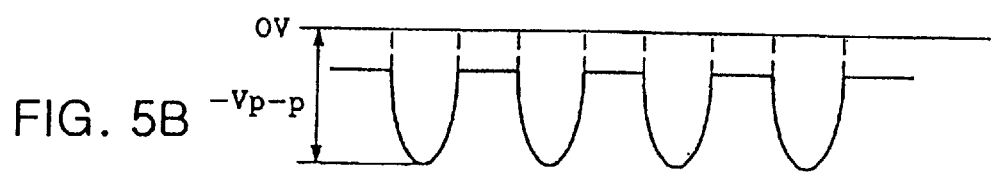
FIG. 5B is a waveform diagram of the voltage supplied to the second patterned section printed on the back of the video board according to the present invention.

When the high voltage is supplied to the CRT 11 by the flyback transformer, the third winding L3 of the transformer induces a pulse voltage opposite to the voltage of FIG. 5A as shown in FIG. 5B. The opposite pulse voltage is applied to the second patterned section 17 of the video board 11 through the pulse applying portion 18.

Accordingly, the negative pulse waveform, which has the same level and phase, but has the opposite polarity to the electric field waveform emitted from the video board as shown in FIG. 5A, is applied to the second patterned section 17 as shown in FIG. 5B.

In other words, because the absolute values of the emitted electric field pulse waveform $+V_{P-P}$ as shown in FIG. 5A and the opposite pulse waveform $-V_{P-P}$ are the same, the electric field emitted from the video board 15 is offset by the opposite pulse voltage, resulting in that the unwanted radiation of the electric field is eliminated.

While the present invention has been described and illustrated herein with reference to the preferred embodiment thereof, it will be understood by those skilled in the art that various changes in form and details may be made therein without departing from the spirit and scope of the invention.

What is claimed is:

1. A device for shielding an electrical field emitted backward from a video display appliance including a CRT having an anode to which a high voltage is supplied, a deflection yoke for deflecting electron beams produced from electron guns, and a video board for processing and outputting video signals to the CRT, the device comprising:

a first patterned section printed on a periphery of a back of the video board and connected to ground; and a second patterned section printed inside the first patterned section, the second patterned section having a pulse applying portion to which a pulse voltage having a polarity opposite to the electric field waveform is applied and a termination portion.

2. The device as claimed in claim 1, wherein the second patterned section is in the form of an open-loop type.

3. The device as claimed in claim 1, wherein the second patterned section is printed on the back of the video board, as a pattern having at least one turn.

* * * * *